(12) United States Patent
Certain et al.

(10) Patent No.: US 6,481,965 B2
(45) Date of Patent: Nov. 19, 2002

(54) ROTARY-WING AIRCRAFT ROTORS WITH MANUALLY FOLDING BLADES AND ELECTRICAL CONNECTION INSTALLATION

(75) Inventors: Nicolas Certain, Aix en Provence (FR); Eric Coisset, Saint Mitre les Remparts (FR)

(73) Assignee: Eurocopter, Marignane Cedex (FR)

( * ) Notice: Subject to any disclaimer, the term of this patent is extended or adjusted under 35 U.S.C. 154(b) by 0 days.

(21) Appl. No.: 09/992,683

(22) Filed: Nov. 19, 2001

(65) Prior Publication Data

US 2002/0081202 A1 Jun. 27, 2002

(30) Foreign Application Priority Data

Dec. 8, 2000 (FR) .............................. 00 15988

(51) Int. Cl.[7] .......................... B64C 27/39; B64C 27/50
(52) U.S. Cl. ...................... 416/95; 416/143; 244/134 D
(58) Field of Search ............................ 416/143, 146 R, 416/39, 95, 134 A, 141; 244/134 D; 219/201, 536, 549; 392/362; 338/214

(56) References Cited

U.S. PATENT DOCUMENTS 5,769,606 A 6/1998 Mondet et al.

6,216,979 B1 4/2001 Faure et al.
2001/0051096 A1 * 12/2001 Potdevin .................... 416/95

FOREIGN PATENT DOCUMENTS

DE 199 22 153 11/2000

* cited by examiner

Primary Examiner—Christopher Verdier
(74) Attorney, Agent, or Firm—Henderson & Sturm LLP

(57) ABSTRACT

On the rotor, between each blade and the member for linking with the hub, an electrical connecting cable comprises a first section of which one part is held above that one of the two blade pins which is the detachable pin whose withdrawal allows the folding of the blade by pivoting about the other blade pin forming a pivot pin, by a holding arrangement tied to this detachable pin, in the flight position of the blade. This section of cable is released from its holding arrangement before the withdrawal of the latter and of the detachable blade pin, which precedes the folding, in such a way that this section of cable deforms naturally on following the pivoting of the blade. After deployment of the blade, a part of the section of cable is again held in the holding arrangement, in the flight position of the blade.

12 Claims, 3 Drawing Sheets

ROTARY-WING AIRCRAFT ROTORS WITH MANUALLY FOLDING BLADES AND ELECTRICAL CONNECTION INSTALLATION

The invention relates to a rotary-wing aircraft rotor whose blades are, at least for some of them, foldable and equipped with electrical equipment, for example a de-icing or anti-icing equipment, requiring the routing of electrical energy or signals between the blades and an electrical collector placed at the centre of the hub of the rotor. This routing of electrical energy or signals is provided by an electrical connection installation, essentially comprising an electrical harness comprising, for each blade, at least one electrical connecting cable, tied to a member for linking the corresponding blade to the hub of the rotor, and provided at its ends with connectors to ensure an electrical connection between the collector and the blade.

More precisely, the invention relates to a rotary-wing aircraft rotor, in particular a helicopter main rotor, of the type known in particular by EP-0 754 623 and FR 2 781 198 and comprising:

- a hub, designed to be driven in rotation about an axis of the hub which is the axis of rotation of the rotor,
- at least two blades, each of which is connected to the hub by a link member that is substantially radial with respect to the axis of rotation, and whose radially outer end is shaped like a fork in which the corresponding blade has its root held by two blade pins substantially parallel with each other and each one traversing aligned bores in the fork and the blade root, at least one blade being foldable on one side of the rotary wing aircraft and having at least one detachable blade pin, such that the withdrawal of the said detachable pin from the blade root and from the fork of the link member, after withdrawing at least a first detachable member for retaining the said detachable blade pin in the said fork, allows the pivoting of the blade about the other pin forming a blade pivot pin, and
- an electrical connection installation comprising, for each blade, at least one electrical connecting cable connecting a first connector, carried by the hub and electrically connected, for example powered, on the latter, to a second connector on the blade and connected to at least one electrical equipment of the said blade, for example a de-icing or anti-icing equipment.

On a rotor according to EP 0 754 623, the connecting cable, for at least one manually foldable blade, comprises a first section, radially towards the outside, arranged like an overhead hook and extending from this blade to the corresponding link member, and connecting the second connector on this blade to a first end, in a radially outer position, of a second section of connecting cable, held substantially radially on this link member. This overhead hook of the connecting cable has a rounded cross section, possibly an armoured structure, and is connected to a plug of the second connector, this plug being connected to the socket of this second connector, this socket being fixed to the blade and connected to the icing or anti-icing equipment of that blade.

During the foldings of the blade, the pivotings of the blade in the radially outer fork of the corresponding link member can introduce damaging tensions in the overhead hook and in the second section of the connecting cable and in the second connector, and/or this overhead hook can oppose a complete folding of the blade.

In order to overcome this disadvantage, it is provided in EP 0 754 623 that the plug of the second connector, at the corresponding end of the overhead hook of the connecting cable, is connected in a detachable manner to the socket of the second connector, which is fixed on the blade. In fact, it is not recommended to give this overhead hook a length sufficient to allow the complete folding of the blade without disconnection at this connector, because an overhead hook of such length would have large forces applied to it and would be subjected to ample flutter movements, favouring its unwanted catching on adjacent components, such as blade root pendular anti-vibration devices, or drag dampers, on a rotor in rotation, on which the corresponding blade carries out angular deflections in pitch, flapping and drag.

Consequently, if it is desired to retain the advantages procured by the other characteristics of the connection installation described in EP 0 754 623, which can be referred to advantageously for more information, it is not possible to avoid manual disconnections and connections between the plug and the socket of the second connector in the case of manual folding or unfolding (or deployment) of the blades, before the folding and after the return of a blade to the flight configuration position respectively.

FR 2 781 198 proposes improvements to rotors with foldable blades and an electrical de-icing installation according to EP 0 754 623, in particular in order to reduce the stresses and/or movements of the connecting cable in its overhead hook section connecting the link member to the second connector on the blade, when the rotor is rotating and during the operations of folding and unfolding the blades.

For this purpose, according to FR 2 781 198, an elongated part of this overhead hook, of substantially flattened rectangular cross section, whose biggest dimension is oriented substantially parallel with the axis of rotation of the rotor, is held in a member, mounted in a fixed manner or pivoting about the folding spindle, in the substantially axial extension of this folding spindle, and arranged as a fork in which the said elongated part of flattened cross section is engaged and held by at least one elastic tab. This retaining fork prevents the displacements of the overhead hook on either side of the folding spindle, during a blade folding or unfolding, which prevents torsions harmful to this section of connecting cable, and it is no longer necessary to disconnect the link between the overhead hook and the de-icing equipment at the level of the second connector, before the folding of the blade, provided that the length of this overhead hook is sufficient without being so long that it generates the said disadvantages (flutter and unwanted catching).

But the flattened rectangular cross section of this overhead hook section of cable above the link between the blade root and the link member can generate a certain aerodynamic drag and cause a disturbing slipstream phenomenon. Furthermore, considering the angular movements, in particular of flapping of this section of cable and of its mechanical link with the link member, when that latter and the blade are carrying out these angular movements, it has proved necessary to form recesses in the periphery of a profiled dome covering the rotor head, and this amplifies the said slipstream phenomenon.

The basic problem for the invention is to overcome these disadvantages whilst avoiding the disconnection between the connecting cable and the second connector on the blade, for the folding of the latter, and avoiding the formation of a disturbing slipstream, caused by recesses in the profiled dome surmounting the rotor head and by a section of connecting cable with a flat profile oriented substantially parallel with the axis of the rotor.

For this purpose, the rotary wing aircraft rotor according to the invention, of the type described above, is characterized in that the connecting cable, for at least one foldable blade, comprises a first flexible section, of essentially cylindrical shape with rounded cross section, preferably substantially circular, connecting the said second connector to a first end, in a radially outer position, of a second section, held on the corresponding link member, of the said connecting cable, whose first section comprises a releasable part which, in the flight configuration of the blade, is maintained above the detachable blade pin by holding means tied to the said detachable blade pin, and also detachable to be able to be withdrawn before the folding of the blade, the said holding means being arranged in such a way as to allow a manual release of the releasable part before their withdrawal, such that the said releasable part is manually released from the said holding means before their withdrawal and such that the folding of the blade by pivoting about the said pivot pin causes the first section of cable to curve and move naturally in order to accommodate itself to the said folding without disconnection at the level of the second connector.

Advantageously, in a simple and practical embodiment, the holding means comprise a cradle formed in the upper end, protruding above the said fork, of a detachable cable holding pin, engaged in the said detachable blade pin, and held in the latter by at least a second detachable holding member, the said releasable part being held, in the flight configuration of the blade, in the said cradle by at least one detachable holding component, such that after the detachment of the said detachable holding component and the withdrawal of the said first and second detachable holding members, the releasable part of the said first section of cable can be released manually from the cradle, and the said detachable blade pin and cable holding pin can be withdrawn from the said fork and from the blade root, for the folding of the blade.

The rounded shape of the cross section of the first section of cable sets up only a limited aerodynamic drag and allows, at the level of the connection with the first end of the second section of cable, a fixing much closer to the link member, such that it is no longer necessary to form recesses in a protective dome of the rotor head. Furthermore, no matter on which side of the helicopter the folding of a blade is carried out, the first section of connecting cable is held, in the flight configuration of the blade, by its releasable part, and by the intermediary of the cradle and the cable holding pin, on that one of the two blade pins that does not constitute the pivot pin for the folding, such that after having manually released this section of cable from the cradle and withdrawn the cable holding pin and the detachable blade pin, this section of cable is completely free between the second connector, on the blade, and the first end of the second section of cable, on the link member, and can deform naturally, in particular it can curve, and move, in particular towards the blade pivot pin, such that it follows the blade during its folding without applying damaging tension to the second connector which it is not therefore useful to disconnect.

Advantageously, the cable holding pin is fitted in a detachable manner in the detachable blade pin, which is tubular, by engagement in the latter, substantially along the axis of the latter, and the said second detachable holding member comprises at least one spring pin, intended to traverse the said detachable blade pin transversely and to be engaged in at least one recess of the said cable holding pin in such a way as to hold the latter substantially axially in the detachable blade pin. Thus, if the recess on the cable holding pin is an orifice drilled through the latter, in such a way that the spring pin can simultaneously traverse transversely the detachable blade pin and the cable holding pin, the latter can be held axially and against any rotation in the detachable blade pin, whilst if the recess in the cable holding pin is a peripheral groove in this pin, the spring pin can hold this cable holding pin axially in the detachable blade pin whilst allowing its rotation about the axis of the latter, this rotation being able to favour the manual release of the releasable part of the first section of cable and/or the manual repositioning of this releasable part in the cradle.

In a known way, the first detachable holding member can also comprise at least one spring pin, intended to traverse the detachable blade pin transversely in its lower end protruding under the fork of the corresponding link member, in such a way as to lock the said detachable blade pin in the position of holding the blade root in the said fork, in the flight configuration of the corresponding blade, and it is then advantageous that this spring pin should constitute simultaneously the second detachable holding member intended to hold the cable holding pin in the detachable blade pin. Thus, if one or two spring pins is or are used to lock the detachable blade pin in the fork, in the flight configuration of the blade, this spring pin or these spring pins simultaneously hold the cable holding pin in the detachable blade pin. The withdrawal of this spring pin or these spring pins makes it possible to withdraw successively the cable holding pin from the detachable blade pin and then the detachable blade pin from the blade root and from the fork, or allows the simultaneous withdrawal of these two pins. But as a variant, the cable holding pin can be held axially in the detachable blade pin in such a way that the former is detachable only with the latter, these two pins being withdrawn or fitted simultaneously.

Advantageously, the releasable part of the first section of cable, which is intended to be held in a detachable manner in the said cradle, is delimited between two over-mouldings of excess thickness on the first section of cable in such a way as to lock the said releasable part in translation in the cradle.

In an advantageously simple embodiment, the detachable holding component can comprise at least one other detachable spring pin, intended to traverse the cradle transversely above the said releasable part of the first section of cable, in such a way as to hold the said releasable part in the cradle. But, as a variant, this detachable holding component can comprise at least one hook articulated on a side of the cradle and closable on the opposite side of the cradle, upon which the hook is intended to be fixed, preferably by at least one other detachable spring pin, in such a way as to hold the said releasable part in the cradle. It is easy to release manually the first section of cable from the cradle or to hold it in the latter by manipulating such detachable holding components.

Advantageously, for a better connection between the first and second sections of connecting cable, this second section extends over the corresponding link member, in a direction inclined with respect to the longitudinal axis of the said link member, and such that its first end, in a radially outer position, is offset laterally towards the outside and held on the said link member by a collar integral with a mount fixed on the link member, preferably by a spindle for holding one end of a drag damper in an attachment fork protruding laterally from the link member.

Also advantageously, as known from EP 0 754 623 and FR 2 781 198, and for the reasons given in these two documents, the second section of cable has an elongated part of substantially flattened rectangular cross section, maintained substantially flat on the top of the said link member, that is to say such that the largest dimension of its cross section is oriented substantially perpendicular to the axis of the rotor, in particular in order to facilitate the fixing of this second section of cable on the link member, to reduce the aerodynamic drag and to attenuate the mechanical forces applied to this section of cable.

Thus, the rotor according to the invention can also benefit from the advantages resulting from the use of other features of the electrical connection installation according to EP 0 754 623 and FR 2 781 198.

In particular, the second section of cable can be advantageously connected to the first connector on the hub by the intermediary of a third section of the connecting cable, the said third section comprising an overhead hook, in the shape of a flattened half-loop, of substantially flattened rectangular cross section whose largest dimension is substantially perpendicular to the axis of rotation, and whose concavity is facing substantially towards holding and articulation means connecting the corresponding link member to the hub, and substantially radially towards the axis of rotation, the said overhead hook being thus deformable in flexion and torsion in order to accommodate itself to the angular deflections in pitch, drag and flapping of the blade and its link member with respect to the hub, as known from the two documents mentioned above.

Similarly, the second section of cable can advantageously be connected to the overhead hook of the third section of cable by a joint connected to the link member by a link which is articulated at least in pivoting manner about an axis substantially parallel with or slightly inclined with respect to the longitudinal pitch change axis of the link member and of the blade, in order to attenuate the mechanical forces applied to the connecting cable whilst allowing a good take-up of the forces applied to the latter when the rotor rotates and the corresponding blade is carrying out its angular deflections in pitch, flapping and lag, as proposed in FR 2 781 198.

Figure 1:
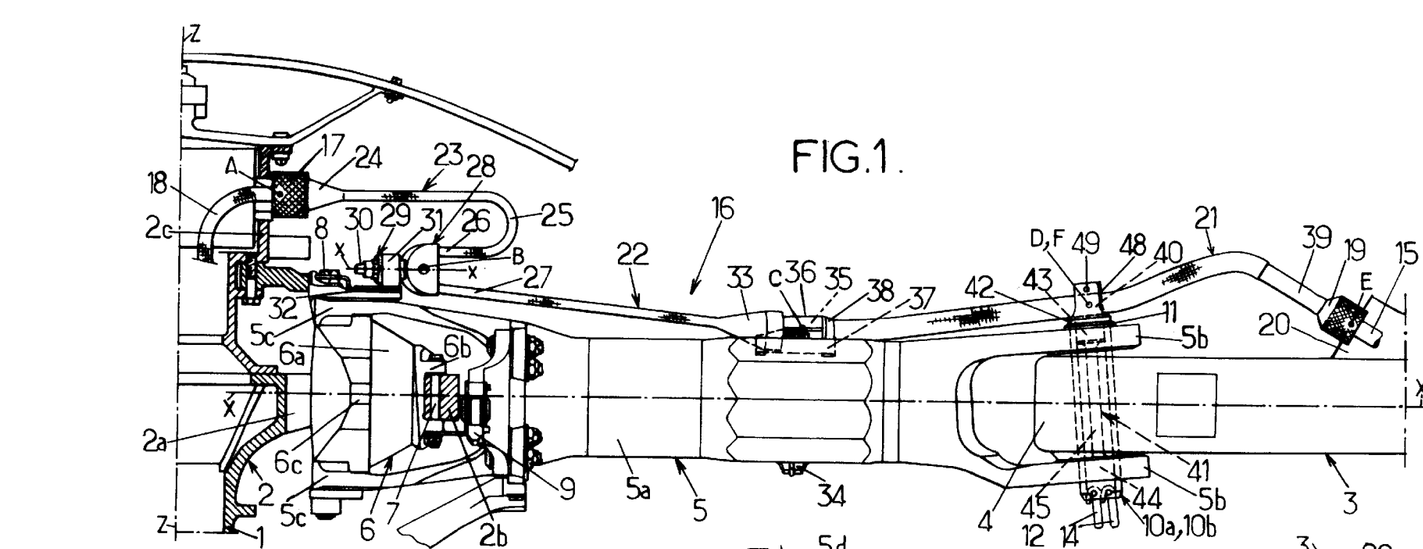
FIG. 1 is a partial diagrammatic view, partly in cross section and partly in side elevation, of a rotor according to the invention, with manually foldable blades, at the level of the link between a blade and the hub and with the connecting cable associated with this blade in an electrical connection installation for powering the electrical de-icing and/or anti-icing equipment, of the rotor blades.
Figure 2:
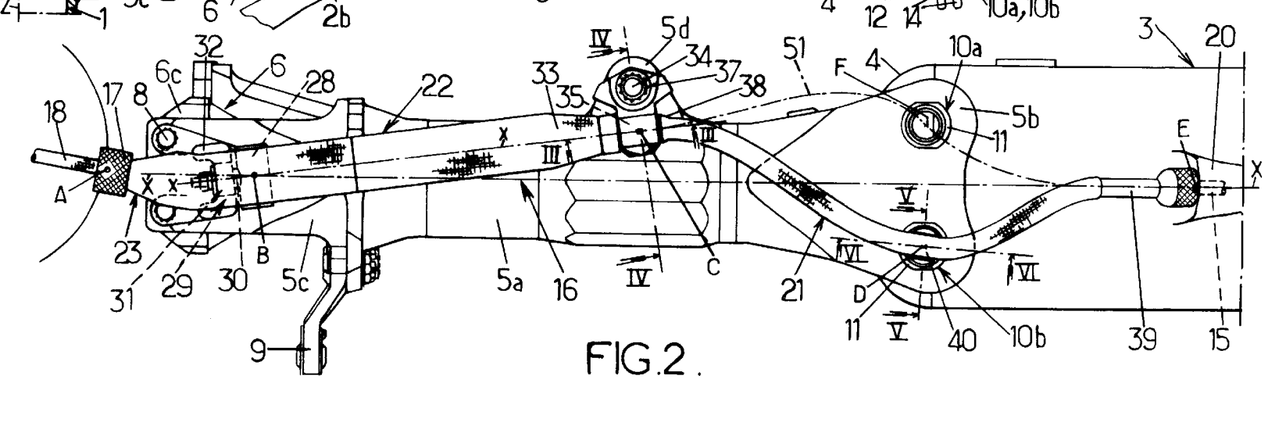
FIG. 2 is a partial diagrammatic plan view of the rotor shown in FIG. 1, FIGS. 3, 4, 5 and 6 are diagrammatic views in cross section along lines III—III, IV—IV, V—V and VI—VI respectively of FIG. 2.
Figure 3:
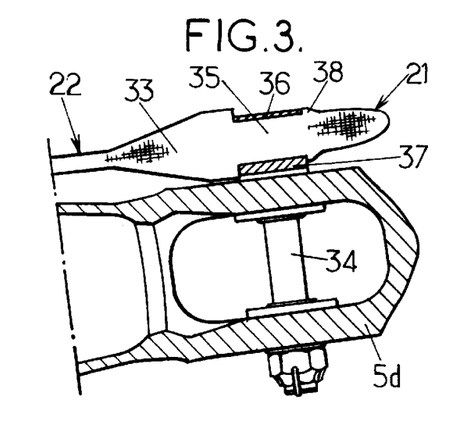

Other advantages and characteristics of the invention will emerge from the description given below, in a non-limitative manner, of a preferred example of embodiment, described with reference to the accompanying drawings in which:

FIGS. 1 and 2 show a main rotor of a helicopter, for example a four-blade rotor, with manual folding of the blades and of the general type described in EP 0 754 623 and FR 2 781 198.

It is recalled that the rotor shaft 1 is integral in rotation with the hub 2 about an axis Z—Z of rotation of the rotor, which is the common axis of the shaft 1 and the hub 2. In the flight configuration, each of the blades 3 is held by its root 4 on a link member 5, referred to as a sleeve in the rest of the description, and which is itself connected to the hub 2 by a retaining and articulation device 6.

On the rotor shown in FIGS. 1 and 2, the hub 2 is of the recessed radial plate type having, for each blade 3, an axial recess 2a housing the retaining and articulation device 6, comprising a laminated spherical stop of a well known type, for withstanding in compression the centrifugal forces during the rotation of the rotor, and to allow the angular deflection of each blade 3 and of its sleeve 5 in pitch, about the longitudinal axis X—X of change of pitch of the blade 3 in question, in flapping about a flapping axis perpendicular to the axes Z—Z and X—X, and in drag about a drag axis perpendicular to the axis X—X and substantially parallel with the axis Z—Z, the axes of flapping, drag and pitch being concurrent at the centre of the laminated spherical stop 6. This stop 6 comprises a central part 6a consisting of an alternated stack of rigid domes and of layers of an elastomer material, shaped like spherical caps whose concavity faces an external radial support 6b, by which the stop 6 is fixed, by bolts 7, to the radially outer edge 2b of the hub plate 2, at the level of the corresponding recess 2a. The stop 6 also comprises an internal radial support 6c, which traverses the recess 2a and is fixed as a cross-piece, by assemblies 8 with axial threaded studs and nuts, between the two prongs of a fork 5c at the radially inner end of the sleeve 5, whose central part 5a is substantially tubular around the longitudinal pitch change axis X—X, which is substantially radial with respect to the axis Z—Z. The outer radial end of each sleeve 5 is also arranged as a fork 5b having two parallel prongs between which is held the root 4 of the corresponding blade 3.

Each sleeve 5 carries, laterally protruding, for example on the leading edge side of the corresponding blade 3, a pitch lever 9 articulated, in a known way (not shown), with a pitch rod connected to a pitch control device, in general an assembly of swashplates, for controlling the pitch of each blade 3 about its pitch axis X—X.

In a known way, each blade root 4 is held in the outer fork 5b by two blade pins 10a, 10b, which are tubular and of generally cylindrical shape with a circular cross section, which are parallel with each other and symmetrical with each other on each side of the longitudinal axis X—X of the sleeve 5 and of the blade 3, the parallel axes of the blade pins 10a and 10b being slightly inclined towards the axis Z—Z of the rotor and upwards. As clearly shown in FIGS. 5 and 6, each blade pin 10a, 10b traverses aligned bores in the blade root 4 and in the two prongs of the fork 5b. Each blade pin 10a, 10b bears against the upper face of the upper prong of the fork 5b by a collar 11 protruding radially outwards at its upper end, and its lower tubular end 12 protrudes under the lower prong of the fork 5b and has, in its outer face, two diametrically opposed flats 13, which are pierced with two pairs of aligned holes, of which each pair is traversed by the respective one of two spring pins 14 constituting detachable members for holding each blade pin 10a, 10b on the fork 5b.

When the spring pins 14 thus traverse the blade pins 10a, 10b at their lower end 12 protruding under the fork 5b of the sleeve 5, the pins 14 hold the blade pins 10a, 10b in the position of holding the blade root 4 in the fork 5b, in the flight configuration of the corresponding blade 3. But the two blade pins 10a, 10b are detachable, after withdrawing the safety pins 14 in order to remove each blade 3, and each blade 3 can be folded manually by withdrawing one 10a or 10b of the two blade pins and by causing the blade 3 to pivot by its root 4 about the other blade pin 10b, 10a, held in position by the corresponding two safety pins 14.

Figure 7:
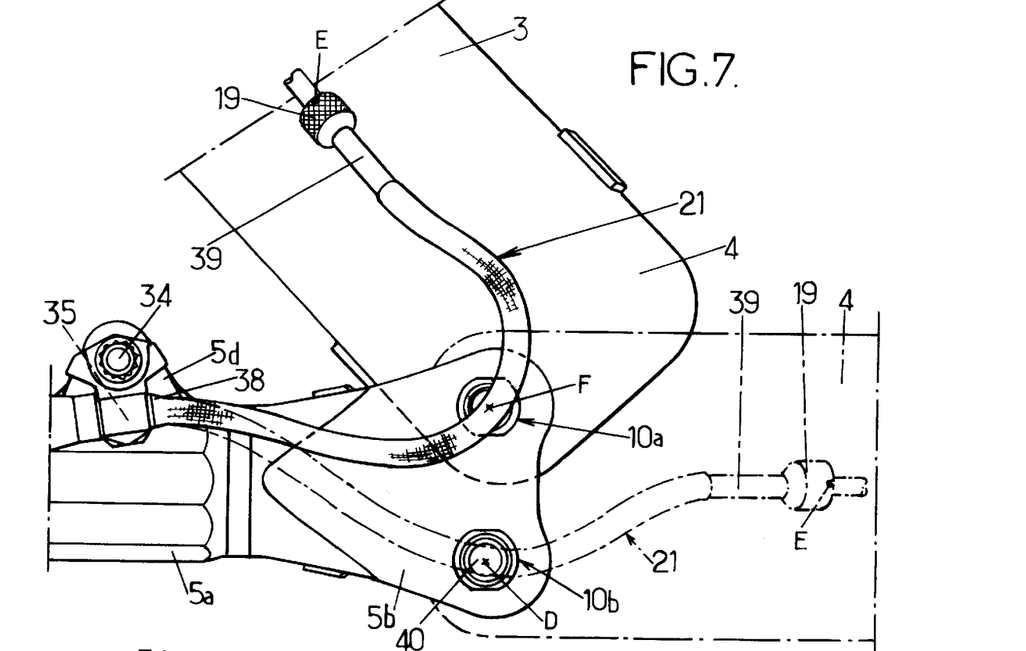
FIG. 7 is a view of a part of FIG. 2 showing a folding of the blade on one side.
Figure 8:
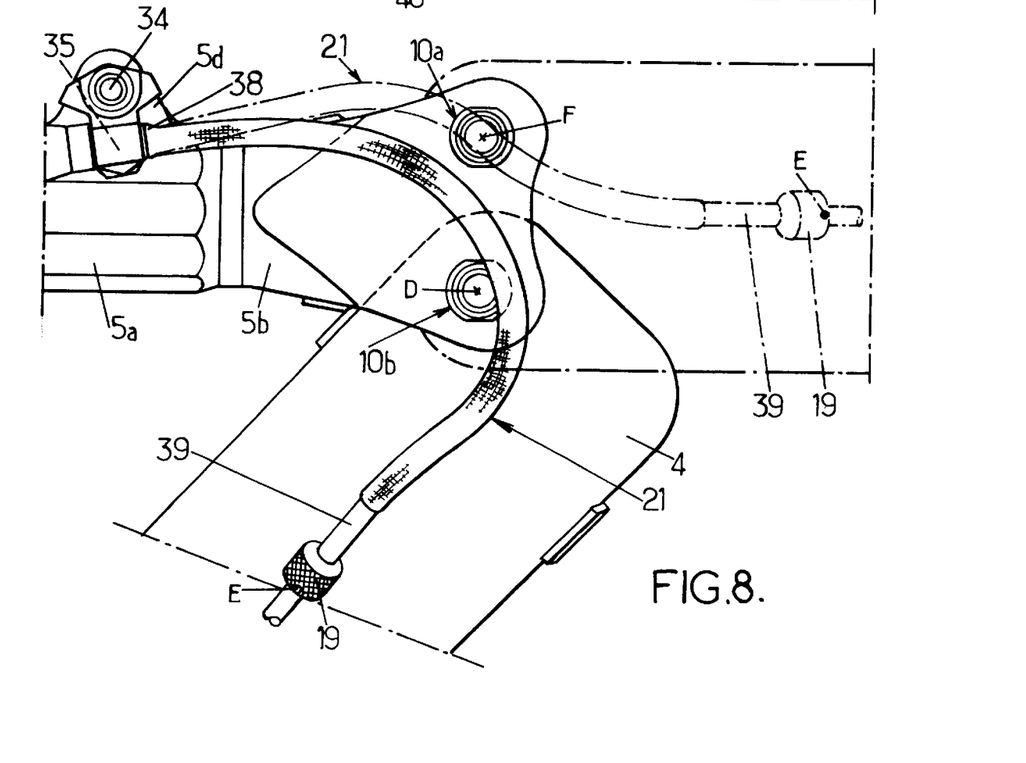
FIG. 8 is a view similar to that of FIG. 7 showing the folding of the blade on the other side.

This conventional method of manually folding the blades 3 is used, on a four-blade rotor with two pairs of diametrically opposed blades and immobilized in rotation for folding, in such a way that the longitudinal axes X—X of the blades are included at about 45° with respect to the longitudinal axis of the helicopter: the front left blade and the rear left blade are folded on the left side and towards the rear of the helicopter, as shown in FIG. 7, whilst the front right blade and the rear right blade are folded on the right and towards the rear of the helicopter, as shown in FIG. 8, the direction of rotation being considered from the axis Z—Z of the rotor and starting from the radial direction of the longitudinal axis X—X of each blade in the flight position. For the blades folded to the left (FIG. 7), the folding is carried out by withdrawing the blade pin 10b and by pivoting the blade root 4 about the blade pin 10a serving as a pivot pin. On the contrary, for the blades folded to the right (FIG. 8), the folding is carried out by withdrawing the blade pin 10a and by pivoting the blade root 4 about the other blade pin 10b serving as a pivot pin.

The rotor is equipped with an electrical connection installation, for example for electrically powering electrical de-icing and/or anti-icing equipment, mounted on each blade 3, from the electrical system on board the helicopter, by means of a rotating collector (not shown) placed at the centre of the hub 2.

The term electrical de-icing and/or anti-icing equipment should be understood to refer to any equipment necessitating an electrical power supply for its operation, command or control, such as de-icing or anti-icing equipment equipping each blade 3 and comprising an array of electrically conductive wires integrated in the blade 3, close to its leading edge, the radially inner end of this conductor array emerging on the upper surface of the blade 3, close to its root 4, substantially on the longitudinal axis X—X, in the form of a cable 15 grouping several long electrical conductors.

For each of the blades 3, this connection installation comprises an electrical connecting cable 16, comprising several long electrical conductors, substantially parallel with each other, embedded in an electrically insulating covering support, insulating the conductors from one another, and itself at least partially surrounded by a mechanically protective cover. This cable 16 is, at one end in the radially inner position, connected to a first connector 17, fixed to a central tubular support 2c which is itself fixed to the central part of the hub 2 and powered by an electrical power supply cable 18 connected to the collector, in such a way that the first connector 17 electrically connects the cable 16 to the power supply cable 18. At its other end, in the radially outer position, the cable 16 is connected to a second connector 19, mounted on a casing 20 fixed on the top of the blade root 4 and substantially centred on the axis X—X, and electrically connected to the cable 15 of the electrical de-icing and/or anti-icing equipment conductors of that blade 3, in such a way that the cable 16 is electrically connected to this cable 15 by the second connector 19.

The connecting cable 16 essentially comprises three sections 21, 22 and 23, in succession, including a first, radially outward section 21, which connects the second connector 19 to the second section of cable 22, in a radially intermediate position, and extending over the corresponding sleeve 5, on the top part of which the section 22 is held substantially at its two ends, this second section 22 being itself connected to the first connector 17 by the intermediary of the third, radially inner, section 23.

The third section 23 is produced substantially as described in EP 0 754 623 and FR 2 781 198, that is to say in the form of an elongated section of cable having a flattened rectangular cross section, whose largest side extends substantially perpendicular to the axis Z—Z and of which one end, in the radially inner position, is connected to the connector 17 by a joint 24 of varying cross section, whilst its radially outer part is folded back on itself in a flattened half-loop forming an overhead hook 25, whose concavity substantially faces radially towards the axis Z—Z and also towards the laminated spherical stop 6 attaching the sleeve 5 to the hub 2. This elongated part of the cable forming, in particular, the hook 25 can have a non-armoured structure like that of FIG. 2a of EP 0 754 623 and described with reference to that figure, with elongated parallel electrical conductors, spaced from one another and embedded in an insulating covering support which is elastically deformable (elastomer or natural rubber), this support being confined between two strips of cloth constituting the major faces of the section 23. This special structure and arrangement procure important advantages, mentioned in the said patents, in particular allowing this third section 23, and in particular its overhead hook 25, to deform in flexion and torsion in order to accommodate itself to angular deflections of the flapping mass constituted by the corresponding blade 4 and its sleeve 5, in pitch, flapping and drag, about the centre of the spherical stop 6 and with respect to the hub 2.

Furthermore, the end 26 of the third section 23 which is opposite to the joint 24 is connected to the radially inner end 27 of the second section 22 substantially as described in FR 2 781 198, that is to say by an articulated support 28, forming a joint between the ends 26 and 27 of the two sections 23 and 22, and held on the sleeve 5 on which this support 28 is articulated by a link 29 which is at least pivoting about a geometrical axis x—x which can be substantially parallel with the longitudinal axis X—X of the sleeve 5 of the corresponding blade 3, but is preferably slightly inclined with respect to this longitudinal axis X—X, as shown in FIG. 2, because of the particular inclined orientation of the section 22 with respect to the axis X—X of the sleeve 5, as described below. As described with reference to FIG. 1a of FR 2 781 198, this pivoting link 29 comprises the support 28 integral with one end of a pivot spindle 30, coaxial with the axis x—x and mounted in a pivoting manner, preferably with the interposition of a self-lubricating bearing, inside a coaxial sleeve 31 fixed to a plate 32 which is itself fixed, for example by screwing, to the upper prong of the fork 5c of the sleeve 5, at the level of the head locks of the threaded studs of the assemblies 8 connecting the inner support 6c of the laminated spherical stop 6 in the radially inner fork 5c of the sleeve 5.

Thus, the joint-support 28, providing mechanical and electrical continuity between the ends 26 and 27 of the sections 23 and 22, is not stressed by the rotations of the sleeve 31 and of the plate 32 with the sleeve 5 about its pitch axis X—X.

This articulated link 29 of the joint-support 28 on the sleeve 5 procures the important advantages mentioned in FR 2 781 198, in particular that of improving the mechanical and electrical performance of the connecting cable 16, in particular by attenuating the mechanical forces applied to the third section of cable 23, as well as a good take up of the forces applied to this section 23 when the rotor is rotating and the blade 3 is making, with the corresponding sleeve 5, angular pitch movements, at the pitch control frequency of the blades, which introduce torsional deformations with this frequency of the third section of cable 23. This articulated pivoting link 29 therefore ensures that the connecting cable 16 has a longer service life.

As a variant, as shown in FIG. 2 of FR 2 781 198, the articulated pivoting link 29 can be replaced by an articulated, ball-joint link, also in order to improve the accommodation of the hook 25 to the angular movements of the flapping mass (3–5) in drag and in flapping. In this case, a ball-joint can be held, on the one hand, about the spindle 30 with which the joint-support 28 is integral, and, on the other hand, inside the sleeve 31, in such a way as to allow not only the overall pivoting of the ends 26 and 27 with the joint-support 28 about the geometric axis x—x of the spindle 30, with respect to the sleeve 31 and the plate 32 integral with the sleeve 5, during the pitch movements of the latter, but also the overall pivoting of the ends 26 and 27 with this ball-joint, centred in a substantially radial plane passing through the axes Z—Z and X—X, when the sleeve 31 and the plate 32 are carrying out, with the sleeve 5, angular deflections in flapping and drag about the centre of articulation of the laminated spherical stop 6. An angular play of a few degrees in drag and flapping, provided by the ball-joint, suffices to reduce very substantially the flexion and torsion stresses that can be undergone by the sections 23 and 22 of the connecting cable 16, due to the drag and flapping movements of the blades 3 and this results in a considerable extension of the service life of the cable 16.

The second section of cable 22 is substantially straight (see FIG. 2) and extends substantially on the upper face of the sleeve 5 up to its end 33, in the radially outer position, formed as a joint of varying cross section, located radially outside of the hook 25. The section of cable 22 has substantially the same shape of flattened rectangular cross section and the same non-armoured structure as the section 23, such that the central part of the section 22 is an elongated part, the largest dimension of its rectangular cross section being substantially perpendicular to the axis of rotation Z—Z, when the sleeve 5 is in the rest state. This section 22 does not extend radially over the sleeve 5, but in a direction inclined with respect to the longitudinal axis X—X of the sleeve 5, as shown in FIG. 2, and such that its radially outer end 33 is offset laterally outwards, substantially up to the level of an attachment fork 5d, protruding laterally outwards on the central section 5a of the sleeve 5, to attach to the latter a ball-joint of an end of a drag damper, whose other end is attached to the sleeve 5 of an adjacent blade 3, in the inter-blade configuration of the drag dampers, or to the hub 2, in the more conventional manner. In this lateral fork 5d of the sleeve 5, the corresponding end of the drag damper is held by a spindle 34, consisting of a screw-nut assembly, as shown in FIG. 4.

Figure 4:
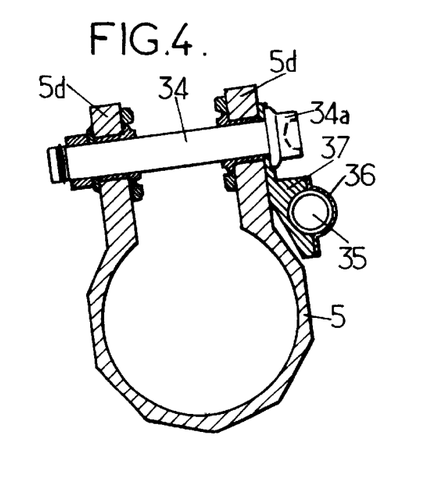

This end 33 of the section 22 is connected mechanically and electrically to an end 35, in the radially inner position, of the first section 21, which is a cylindrical end of circular cross section fixed by a metal collar 36 to a mount 37, which is itself held on the upper prong of the lateral fork 5d by the head 34a of the screw of the fixing spindle 34 (see FIG. 4). This end 35 is delimited, on the section 21 side, by an over-moulding 38 of its outer cover, forming a stop preventing the axial sliding of the section of cable 21 in the collar 36 and the mount 37.

Thus, the section of cable 22 is maintained substantially flat on the top of the sleeve 5, to which it is tied at its inner end 27, by the articulated link 29 described above, and at the level of its outer end 33 by a second link, provided by its connection to the inner end 35 of the first section 21, this end 35 being tied to the sleeve 5 by the said collar 36 and the said mount 37.

The first section of cable 21 connects the sleeve 5, to which it is bound by its inner end 35, to the blade 3 whilst being connected, at its other end 39, in the radially outer position, to the connector 19 for connecting the de-icing cable 15. This first section 21 has a generally cylindrical shape of rounded cross section, preferably circular, and it is flexible, except possibly at its end 39 connected to the connector 19 and which can be armoured.

In its central portion, the section 21 comprises a part 40 called "releasable" which, in the flight position of the blade 3 (see FIGS. 1 and 2) is held above that one of the two blade pins 10a and 10b which is not the pivot pin for that blade 3, that is to say above the detachable blade pin whose withdrawal is necessary to allow the folding of that blade 3 by pivoting about the pivot pin, and this holding is provided by holding means, which are tied to the detachable blade pin and are also detachable to be able to be withdrawn, preferably before or at the same time as the detachable blade pin, in order to allow the folding, the releasable part 40 of the section 21 being manually released from these holding means before their withdrawal, such that during the operations of folding and deployment of the blade 3, the section 21 is totally free between its ends 39 and 35, and deforms naturally by curving and moving in order to accommodate itself to the pivoting of the blade 3 with respect to the sleeve 5, without necessitating disconnection at the level of the connector 19 on the blade 3.

In FIGS. 1 and 2, by way of example, it is assumed that the blade 3 folds to the left (see FIG. 7) in such a way that the blade pivot pin is the pin 10a and the detachable blade pin is the pin 10b.

The holding means of the releasable part 40 of the section 21, in the flight position of the blade, are now described with reference to FIGS. 1, 2, 5 and 6.

These holding means comprise a detachable cable holding pin 41, which is fitted in a detachable manner on the detachable blade pin, in this case 10b, by engagement from above in the tubular pin 10b and along the axis of this pin 10b, until a radially external collar 42 of the pin 41 bears on the collar 11 of the top end of the pin 10b. The cable holding pin 41 has an upper cylindrical bearing surface 43 and a lower cylindrical bearing surface 44 which guide and position the pin 41 in the pin 10b, and are connected by a central rod 45 extended below the lower bearing surface 44 by a lower end-piece 46, housed in the lower end 12 of the pin 10b, and therefore protruding under the fork 5b. This lower end-piece 46 has a peripheral groove 47 in which there can be engaged tangentially the spring pins 14 for holding the pin 10b in the fork 5b, such that the spring pins 14 simultaneously constitute detachable holding members ensuring the axial holding of the pin 41 in the pin 10b, whilst allowing the rotation of the pin 41 about its longitudinal axis in the pin 10b, and it can be understood that the withdrawal of the spring pins 14 allows the pin 41 to be withdrawn from the pin 10b and then the withdrawal of the pin 10b from the fork 5b and from the blade root 4, or the withdrawal of the pin 41 at the same time as the pin 10b, to allow the folding about the pivot pin 10a.

Figure 5:
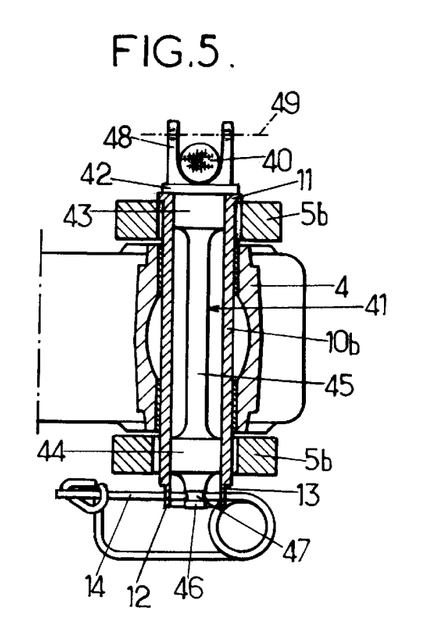

Above its collar 42, and therefore protruding above the fork 5b, the pin 41 has, substantially in its axial projection, an upper end shaped like a cradle 48 of generally half-cylindrical shape, in which the releasable part 40 of the section of cable 21 is engaged and held by a detachable holding component connecting the two sides of the cradle 48 above the releasable part 40, for example another spring pin 49, represented only by its axis in FIG. 5, and engaged in a detachable way in facing holes in the sides of the cradle 48. In this way, after the detachment of the spring pin 49, whilst the pin 41 is still retained in the pin 10b, the releasable part 40 of the section of cable 21 can be manually released from the cradle 48, which releases the section 21 between its ends 35 and 39.

Figure 6:
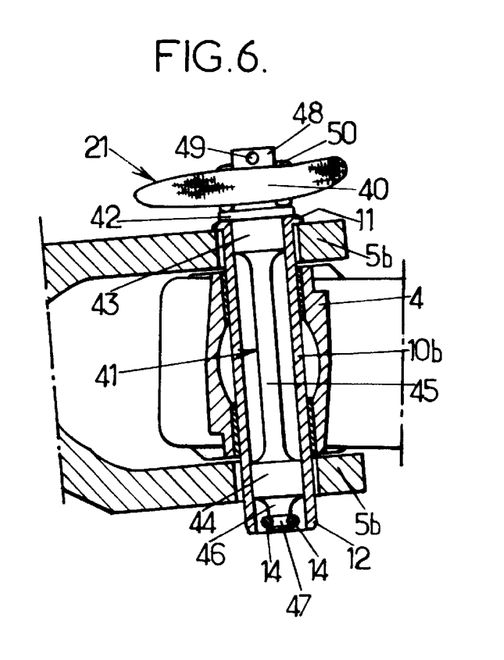

In order to lock the releasable part 40 in translation in the cradle 48 this releasable part 40 is delimited by two stops protruding radially outwards, in a convenient manner, by over-mouldings 50 in excess thickness on the outer cover of the section of cable 21 (see FIG. 6).

In this example, the pin 41 can pivot freely in the pin 10b and about the axis of the latter, without being locked in rotation by the pins 14, in order to facilitate the manual operations of releasing the releasable part 40 with respect to this cradle 48 or, on the contrary, of returning this releasable part 40 into position in the cradle 48. As a variant, the end-piece of the lower end 46 of the pin 41 can be pierced with two holes which must be placed facing holes in the lower end 12 of the pin 10b in order to allow the passage of spring pins 14, such that the pin 41 is then locked in rotation in the pin 10b.

As a variant, the spring pin 49 constituting the detachable component holding the releasable part 40 in the cradle 48 can be replaced by an articulated hook, mounted in a pivoting manner on one side of the cradle 48 and able to be closed down on the other side of the cradle 48, upon which this hook can be fixed, in a detachable manner, for example by at least one other detachable spring pin in such a way at to hold the releasable part 40 of the section 21 in the cradle 48.

In the flight position of the blade 3, the connecting cable 16 therefore passes through the points A, B, C, D and E (see FIGS. 1 and 2) which are respectively the centre of the connector 17, of the joint-support 28, of the end 35 of the section 21, of the releasable part 40 of this section 21 and of the connector 19. The section 21 thus has a very progressive curvature with its concavity facing the pivot pin 10a.

Starting from this position, the procedure for folding the blade 3 is as follows. The pin 49 for holding the releasable part 40 of the section 21 in the cradle 48 is withdrawn from the pin 41, and the two spring pins 14 are withdrawn from the detachable blade pin 10b and from the lower end of the cable holding pin 41. The section of cable 21 is raised slightly and its releasable part 40 is released manually from the cradle 48 and the holding pin 41 is then withdrawn. Then the detachable blade pin 10b is extracted, and it is then possible to pivot the blade 3 towards the left, as shown in FIG. 7 by pivoting about the pivot pin 10a. Under the effect of the rotation of the blade 3, the section of cable 21, which is completely free between its ends 35 and 39, naturally assumes a tighter curvature and moves towards the pivot pin 10a, as shown in FIG. 7.

At the end of the folding, the assembly of the two pins 10b and 41 can be put back into the bores of the fork 5b and the spring pins 14 can be put back into position, as well as the spring pin 49 on the cradle 48, in order to prevent the loss of these parts.

The deployment (or unfolding) procedure of the blade is carried out in the reverse order from that of the operations described above.

If the blade 3 in FIGS. 1 and 2 is a blade that folds towards the right, as shown in FIG. 8, then the cable holding pin 41 with its cradle 48 and the detachable holding component such as the associated pin 49 are fitted in the blade pin 10a, which is the detachable blade pin whose withdrawal is necessary to allow the folding by pivoting the blade 3 about the other blade pin 10b, serving as a pivot pin. In this case, the routing of the connecting cable 16 passes through the points A, B, C, F and E, the point F being at the centre of the cradle 48 of the pin 41 engaged in the blade pin 10a, and the routing of the section of cable 21 is then as shown by the dotted and dashed axis line 51 in FIG. 2, between the two ends 35 and 39 of this section 21, which occupy exactly the same positions as when the folding of the blade 3 is carried out towards the left. The procedure for folding the blade 3 towards the right (see FIG. 8) is the same as the one previously described, the only difference being that the pin 10a is the detachable blade pin and the pin 10b is the pivot pin and the routing of the section of cable 21, in an S-shape in the flight position of the blade, as shown in dotted and dashed line in FIG. 8 changes, on folding the blade 3, into a routing with a U-shaped curve and with a displacement of the section of cable 21 towards the pivot pin 10b, substantially as in the case of a folding towards the left (see FIG. 7).

The device described above is compatible with the manual folding of the blades without disconnecting the connecting cables 16 at the level of the connectors 19, the only difference between a blade folding towards the left and a blade folding towards the right being the choice of the blade pin 10b or 10a which is the detachable blade pin and which receives the cable holding pin 41 with its cradle 48 and its pin 49 in order to hold the releasable part 40 of the section of cable 21, when the blade is in the flight position.

What is claimed is:

1. A rotary-wing aircraft rotor, comprising:
    a hub, designed to be driven in rotation about an axis of the hub which is the axis of rotation of the rotor,
    at least two blades, each of which is connected to the hub by a link member that is substantially radial with respect to the axis of rotation, and having a radially outer end shaped like a fork in which the corresponding blade has a root held by two blade pins substantially parallel with each other and each one traversing aligned bores in the fork and the blade root, at least one blade being foldable on one side of the rotary wing aircraft rotor and having at least one detachable blade pin, such that the withdrawal of said detachable pin from the blade root and from the fork of the link member, after withdrawing at least a first detachable member for retaining said detachable blade pin in said fork, allows the pivoting of said blade about the other pin forming a blade pivot pin, and
    an electrical connection installation comprising, for each blade, at least one electrical connecting cable connecting a first connector, carried by the hub and electrically connected on the hub, to a second connector on the blade and connected to at least one electrical equipment of said blade,
    wherein the connecting cable, for at least one foldable blade, comprises a first flexible section, of essentially cylindrical shape with a rounded cross section, connecting said second connector to a first end, in a radially outer position, of a second section, held on the corresponding link member, of said connecting cable, whose first section comprises a releasable part which, in the flight configuration of the blade, is maintained above the detachable blade pin by holding means tied to said detachable blade pin, and is also detachable to be able to be withdrawn before the folding of the blade, said holding means being arranged in such a way as to allow a manual release of the releasable part before their withdrawal, such that said releasable part is manually released from said holding means before their withdrawal and such that the folding of the blade by pivoting about said pivot pin causes the first section of cable to curve and move naturally in order to accommodate itself to said folding without disconnection at the level of the second connector.

2. A rotor according to claim 1, wherein said holding means comprise a cradle formed in an upper end, protruding above said fork, of a cable holding pin, engaged in said detachable blade pin, and held in the detachable blade pin by at least a second detachable holding member, said releasable part being held, in the flight configuration of the blade, in said cradle by at least one detachable holding component, such that after the detachment of said detachable holding component and the withdrawal of said first and second detachable holding members, the releasable part of said first section of cable can be released manually from the cradle, and said detachable blade pin and cable holding pin can be withdrawn from said fork and from the blade root, for the folding of the blade.

3. A rotor according to claim 2, wherein the cable holding pin is fitted in a detachable manner in the detachable blade pin, which is tubular, by engagement in said detachable blade pin, substantially along the axis of the detachable blade pin, and said second detachable holding member comprises at least one spring pin, intended to traverse said detachable blade pin transversely and to be engaged in at least one recess of said cable holding pin in such a way as to hold the cable holding pin substantially axially in the detachable blade pin.

4. A rotor according to claim 3, wherein said first detachable holding member also comprises at least one spring pin, intended to traverse said detachable blade pin transversely in a lower end protruding under the fork of the corresponding link member, in such a way as to lock said detachable blade pin in the position of holding the blade root in said fork, in the flight configuration of the corresponding blade, said spring pin constituting simultaneously said second detachable holding member intended to hold the cable holding pin in the detachable blade pin.

5. A rotor according to claim 2, wherein said releasable part of the first section of cable, which is intended to be held in a detachable manner in said cradle, is delimited between two over-mouldings of excess thickness on the first section of cable in such a way as to lock said releasable part in translation in the cradle.

6. A rotor according to claim 2, wherein said detachable holding component comprises at least one other detachable pin, intended to traverse the cradle transversely above said releasable part of the first section of cable, in such a way as to hold said releasable part in the cradle.

7. A rotor according to claim 2, wherein said detachable holding component comprises at least one hook articulated on a side of the cradle and closable on the opposite side of the cradle, upon which the hook is intended to be fixed, by at least one other detachable spring pin, in such a way as to hold said releasable part in the cradle.

8. A rotor according to claim 2, wherein said cable holding pin is free in rotation in said detachable blade pin about the axis of the detachable blade pin.

9. A rotor according to claim 1, wherein said second section of connecting cable extends over said link member, in a direction inclined with respect to the longitudinal axis of said link member, and such that a first end of said second section, in a radially outer position, is offset laterally towards the outside and held on said link member by a collar integral with a mount fixed on the link member.

10. A rotor according to claim 1, wherein the second section of cable has an elongated part of substantially flattened rectangular cross section, maintained substantially flat on the top of said link member.

11. A rotor according to claim 1, wherein said second section of cable is connected to the first connector on the hub by a third section of the connecting cable, said third section comprising an overhead hook, in the shape of a flattened half-loop, of substantially flattened rectangular cross section whose largest dimension is substantially perpendicular to the axis of rotation, and whose concavity is facing substantially towards holding and articulation means connecting the corresponding link member to the hub, and substantially radially towards the axis of rotation, said overhead hook being deformable in flexion and torsion in order to accommodate itself to the angular deflections in pitch, drag and flapping of the blade and corresponding link member with respect to the hub.

12. A rotor according to claim 11, wherein the second section of cable is connected to the overhead hook of the third section of cable by a joint connected to the link member by a link which is articulated at least in pivoting manner about an axis substantially parallel with or slightly inclined with respect to the longitudinal pitch change axis of the link member and of the blade.

* * * * *